US012610333B2

(12) United States Patent
Lei

(10) Patent No.: US 12,610,333 B2
(45) Date of Patent: Apr. 21, 2026

(54) DATA TRANSMISSION METHOD, DATA TRANSMISSION APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Yixue Lei, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 362 days.

(21) Appl. No.: 18/219,449

(22) Filed: Jul. 7, 2023

(65) Prior Publication Data

US 2023/0362856 A1 Nov. 9, 2023

Related U.S. Application Data

(63) Continuation of application No. PCT/CN2022/141146, filed on Dec. 22, 2022.

(30) Foreign Application Priority Data

May 6, 2022 (CN) .......................... 202210486695.3

(51) Int. Cl.
*H04W 56/00* (2009.01)
(52) U.S. Cl.
CPC ................................ *H04W 56/003* (2013.01)
(58) Field of Classification Search
None
See application file for complete search history.

(56) References Cited

U.S. PATENT DOCUMENTS

2022/0303804 A1* 9/2022 Ha .......................... H04W 24/08
2024/0323724 A1* 9/2024 Guo .................. H04W 28/0268

OTHER PUBLICATIONS

"3rd Generation Partnership Project; Technical Specification Group Services and System Aspects; Study on XR (Extended Reality) and media services (Release 18)", 3GPP Standard, Technical Report, 3GPP TR 23.700-60, 3rd Generation Partnership Project (3GPP), Mobile Competence Centre, 650, Route Des Lucioles, F-06921, Sophia-antipolis Cedex, France, No. V0.2.0, XP052146077, Apr. 22, 2022, pp. 1-131.
Extended European Search Report received for European Patent Application No. 22940781.2, mailed on Jun. 20, 2025, 10 pages.

(Continued)

*Primary Examiner* — Anh Ngoc M Nguyen
(74) *Attorney, Agent, or Firm* — ArentFox Schiff LLP

(57) ABSTRACT

In a method for data transmission, delay jitter characteristics of service data packets during transmission of the service data packets are received. The delay jitter characteristics indicate changes in transmission delay of the service data packets. Whether jitter optimization is to be performed is determined by an application layer device according to the delay jitter characteristics and delay jitter requirements of the service data packets. First indication information is transmitted to a core network element when the jitter optimization is determined to be performed. The core network element is configured to start delay jitter optimization in response to the first indication information.

20 Claims, 9 Drawing Sheets

(56)         References Cited

OTHER PUBLICATIONS

International Search Report and Written Opinion received for PCT Patent Application No. PCT/CN2022/141146, mailed on Feb. 15, 2023, 9 pages (2 pages of English Translation and 7 pages of Original Document).

Tencent et al., "KI#6, New Sol: Policy enhancements to minimize jitter for XR and Media Services", Tencent Cloud, SA WG2 Meeting#150e, Apr. 25, 2022, 4 pages.

* cited by examiner

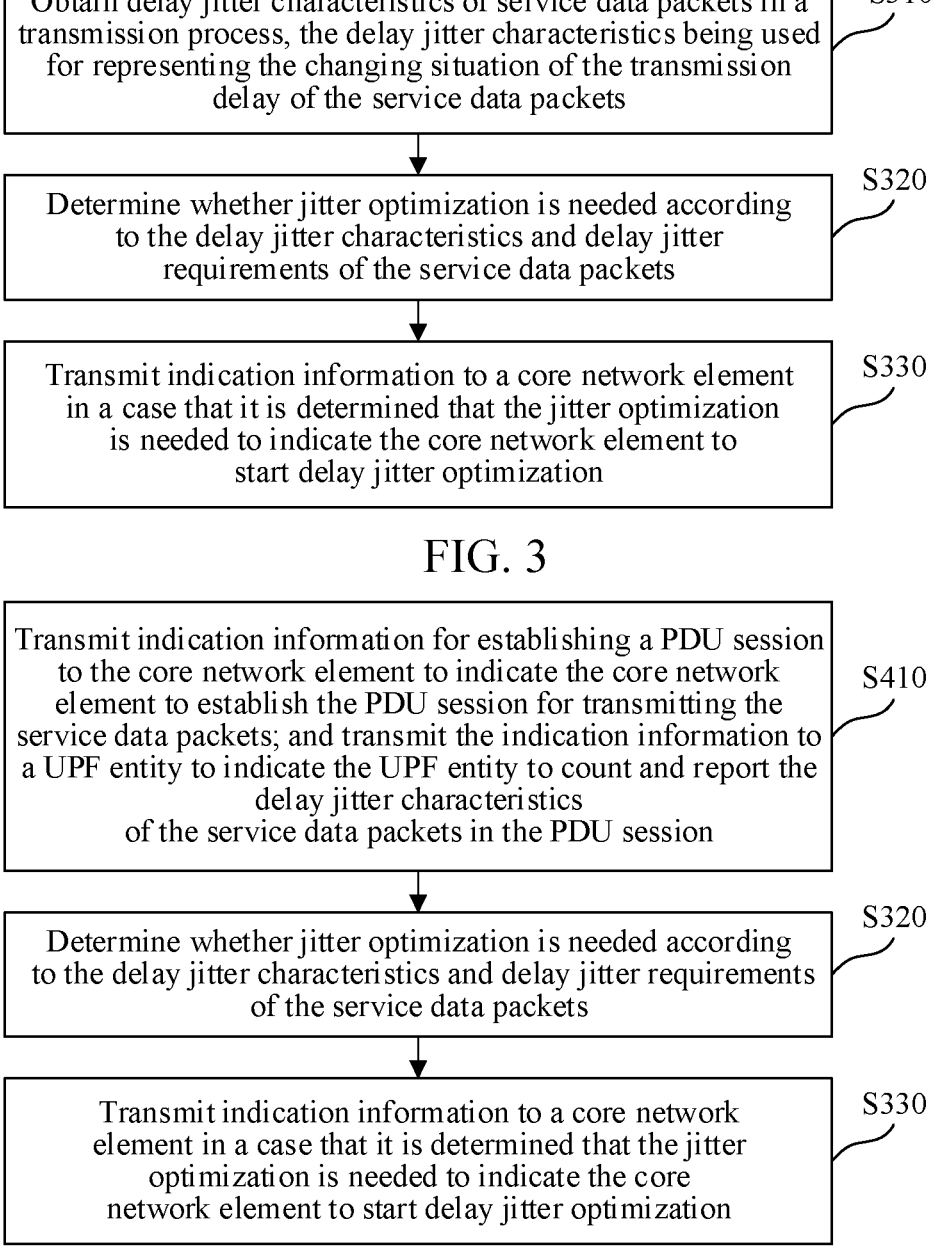

Obtain delay jitter characteristics of service data packets in a transmission process, the delay jitter characteristics being used for representing the changing situation of the transmission delay of the service data packets — S310

Determine whether jitter optimization is needed according to the delay jitter characteristics and delay jitter requirements of the service data packets — S320

Transmit indication information to a core network element in a case that it is determined that the jitter optimization is needed to indicate the core network element to start delay jitter optimization — S330

FIG. 3

Transmit indication information for establishing a PDU session to the core network element to indicate the core network element to establish the PDU session for transmitting the service data packets; and transmit the indication information to a UPF entity to indicate the UPF entity to count and report the delay jitter characteristics of the service data packets in the PDU session — S410

Determine whether jitter optimization is needed according to the delay jitter characteristics and delay jitter requirements of the service data packets — S320

Transmit indication information to a core network element in a case that it is determined that the jitter optimization is needed to indicate the core network element to start delay jitter optimization — S330

FIG. 4

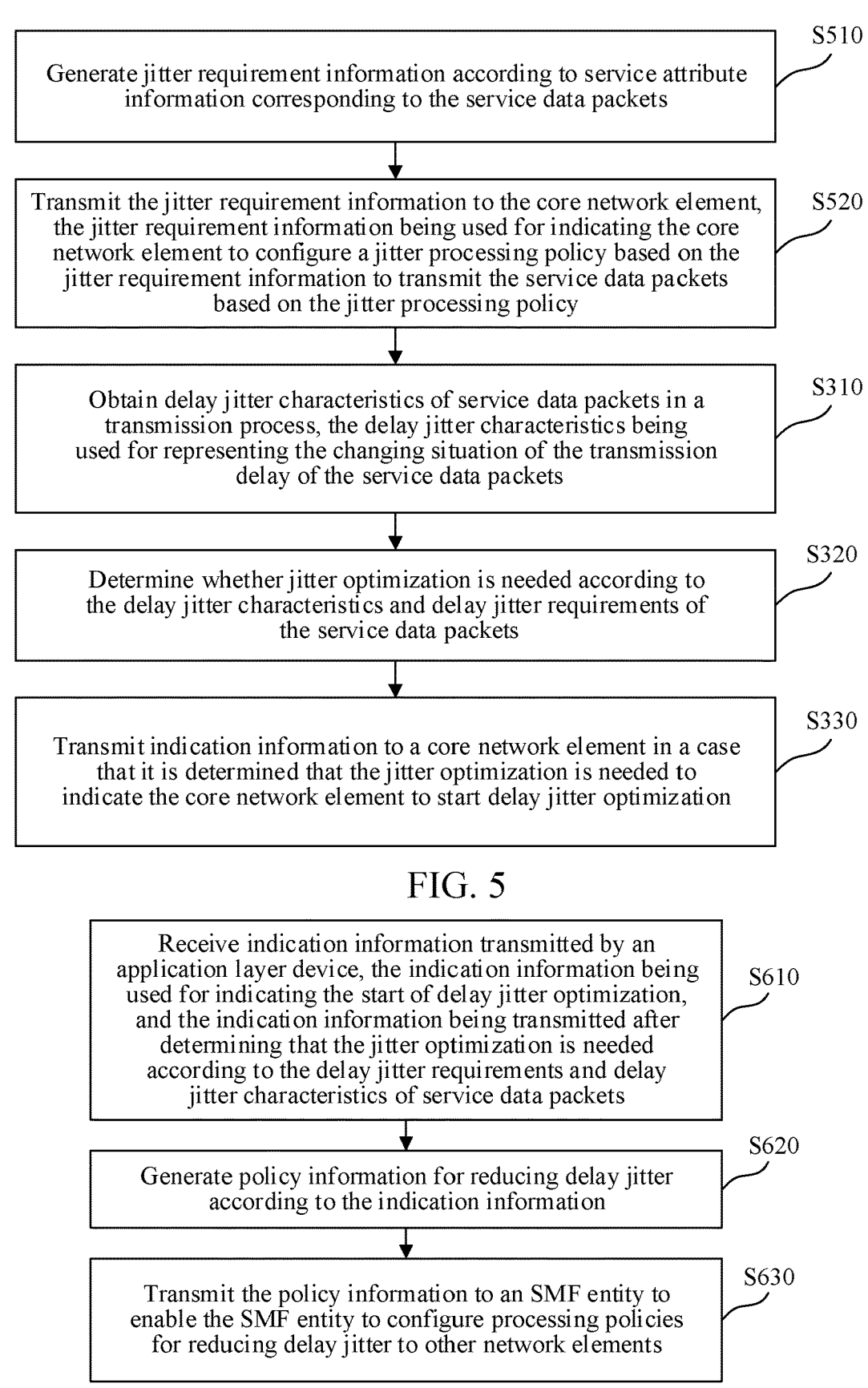

Generate jitter requirement information according to service attribute information corresponding to the service data packets — S510

Transmit the jitter requirement information to the core network element, the jitter requirement information being used for indicating the core network element to configure a jitter processing policy based on the jitter requirement information to transmit the service data packets based on the jitter processing policy — S520

Obtain delay jitter characteristics of service data packets in a transmission process, the delay jitter characteristics being used for representing the changing situation of the transmission delay of the service data packets — S310

Determine whether jitter optimization is needed according to the delay jitter characteristics and delay jitter requirements of the service data packets — S320

Transmit indication information to a core network element in a case that it is determined that the jitter optimization is needed to indicate the core network element to start delay jitter optimization — S330

FIG. 5

Receive indication information transmitted by an application layer device, the indication information being used for indicating the start of delay jitter optimization, and the indication information being transmitted after determining that the jitter optimization is needed according to the delay jitter requirements and delay jitter characteristics of service data packets — S610

Generate policy information for reducing delay jitter according to the indication information — S620

Transmit the policy information to an SMF entity to enable the SMF entity to configure processing policies for reducing delay jitter to other network elements — S630

FIG. 6

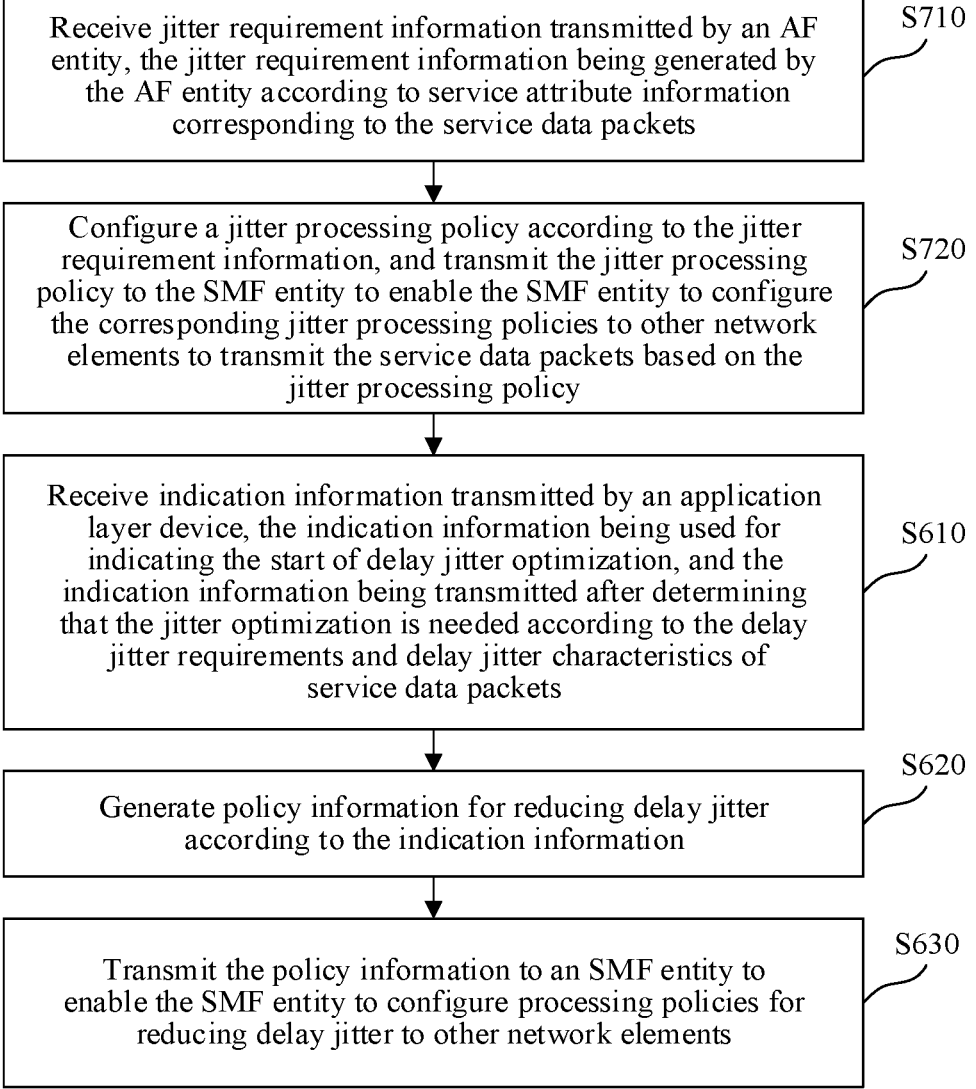

Receive jitter requirement information transmitted by an AF entity, the jitter requirement information being generated by the AF entity according to service attribute information corresponding to the service data packets — S710

Configure a jitter processing policy according to the jitter requirement information, and transmit the jitter processing policy to the SMF entity to enable the SMF entity to configure the corresponding jitter processing policies to other network elements to transmit the service data packets based on the jitter processing policy — S720

Receive indication information transmitted by an application layer device, the indication information being used for indicating the start of delay jitter optimization, and the indication information being transmitted after determining that the jitter optimization is needed according to the delay jitter requirements and delay jitter characteristics of service data packets — S610

Generate policy information for reducing delay jitter according to the indication information — S620

Transmit the policy information to an SMF entity to enable the SMF entity to configure processing policies for reducing delay jitter to other network elements — S630

Data transmission apparatus

1002

Obtaining unit

1004

Determining unit

1006

Transmitting unit

1100

Data transmission apparatus

1102

Receiving unit

1104

Generation unit

1106

Processing unit

1200

DATA TRANSMISSION METHOD, DATA TRANSMISSION APPARATUS, COMPUTER-READABLE MEDIUM, AND ELECTRONIC DEVICE

RELATED APPLICATIONS

The present application is a continuation of International Application No. PCT/CN2022/141146 filed on Dec. 22, 2022, which claims priority to Chinese Patent Application No. 202210486695.3, entitled "DATA TRANSMISSION METHOD, DATA TRANSMISSION APPARATUS, COMPUTER-READABLE MEDIUM, AND ELECTRONIC DEVICE" and filed on May 6, 2022. The entire disclosures of the prior application are hereby incorporated by reference.

FIELD OF THE TECHNOLOGY

This disclosure relates to the field of computer and communication technologies, including to a data transmission method, a data transmission apparatus, a computer-readable medium, and an electronic device.

BACKGROUND OF THE DISCLOSURE

In 5G and evolving 5G systems, high-bandwidth interactive services are important types of services, such as cloud gaming, virtual reality (VR), augmented reality (AR), mixed reality (MR), extended reality (XR), and cinematic reality (CR).

These high-bandwidth interactive services may not only require high timeliness in transmission, but also greatly increase the amount of data generated by an application layer with the improvement of indicators such as resolution, frame rate and degree of freedom, thereby bringing a significant load to network transmission. Moreover, these services may greatly depend on the transmission performance of a network, and even minor changes in the network may affect the actual effects of these services, so how to ensure the transmission quality of service data packets is an urgent technical problem to be solved.

SUMMARY

Embodiments of this disclosure provide a data transmission method, a data transmission apparatus, a non-transitory computer-readable storage medium, and an electronic device, which may ensure that the network delay jitter during transmission of service data packets is within an acceptable range, thereby being favorable for improving the network transmission quality of the service data packets.

According to one aspect, an embodiment of this disclosure provides a method for data transmission. The method is performed by an application layer device, for example. In the method for data transmission, delay jitter characteristics of service data packets during transmission of the service data packets are received. The delay jitter characteristics indicate changes in transmission delay of the service data packets. Whether jitter optimization is to be performed is determined by an application layer device according to the delay jitter characteristics and delay jitter requirements of the service data packets. First indication information is transmitted to a core network element when the jitter optimization is determined to be performed. The core network element is configured to start delay jitter optimization in response to the first indication information.

According to another aspect, an embodiment of this disclosure provides a method for data transmission. The method is performed by a core network element, for example. In the method for data transmission, first indication information indicating that jitter optimization is to be performed is received from an application layer device. The first indication information is transmitted by the application layer device based on a determination that the jitter optimization is to be performed according to delay jitter requirements and delay jitter characteristics of service data packets. Policy information is set by a core network element to reduce delay jitter according to the first indication information. The policy information is transmitted to a session management function (SMF) entity that is configured to set processing policies for reducing delay jitter to other network elements.

According to another aspect, an embodiment of this disclosure provides a data transmission apparatus, including processing circuitry. The processing circuitry is configured to receive delay jitter characteristics of service data packets during transmission of the service data packets. The delay jitter characteristics indicate changes in transmission delay of the service data packets. The processing circuitry is configured to determine whether jitter optimization is to be performed according to the delay jitter characteristics and delay jitter requirements of the service data packets. The processing circuitry is configured to transmit first indication information to a core network element when the jitter optimization is determined to be performed. The core network element is configured to start delay jitter optimization in response to the first indication information.

According to another aspect, an embodiment of this disclosure provides a data transmission apparatus, including processing circuitry. The processing circuitry is configured to receive first indication information indicating that jitter optimization is to be performed from an application layer device. The first indication information is transmitted by the application layer device based on a determination that the jitter optimization is to be performed according to delay jitter requirements and delay jitter characteristics of service data packets. The processing circuitry is configured to set policy information to reduce delay jitter according to the first indication information. The processing circuitry is configured to transmit the policy information to a session management function (SMF) entity that is configured to set processing policies for reducing delay jitter to other network elements.

According to another aspect, an embodiment of this disclosure provides a non-transitory computer-readable medium, storing instructions which when executed by a processor cause the processor to perform any of the data transmission methods.

According to another aspect, an embodiment of this disclosure provides an electronic device, including: one or more processors; and a storage apparatus, configured to store one or more computer programs, the one or more computer programs, when executed by the one or more processors, causing the electronic device to implement any of the data transmission methods.

According to another aspect, an embodiment of this disclosure provides a computer program product, the computer program product includes a computer program, and the computer program is stored in a computer-readable storage medium. A processor of an electronic device reads the computer program from the computer-readable storage medium and executes the computer program to cause the electronic device to perform any of the data transmission methods.

In an example, by obtaining delay jitter characteristics of service data packets in a transmission process and determining that jitter optimization is needed according to the delay jitter characteristics and delay jitter requirements of the service data packets, an application layer device transmits indication information to a core network element, so that in the transmission process of the service data packets, delay jitter optimization may be performed on a network in time according to the delay jitter characteristics of the service data packets to ensure that the network delay jitter during transmission of the service data packets is within an acceptable range. As a result, the network transmission quality of the service data packets may be improved, which is favorable for enhancing the experience brought by services.

BRIEF DESCRIPTION OF THE DRAWINGS

FIG. 3 is a flowchart of a data transmission method provided in an embodiment of this disclosure.

FIG. 4 is a flowchart of a data transmission method provided in another embodiment of this disclosure.

FIG. 5 is a flowchart of a data transmission method provided in an embodiment of this disclosure.

FIG. 6 is a flowchart of a data transmission method provided in another embodiment of this disclosure.

FIG. 7 is a flowchart of a data transmission method provided in a further embodiment of this disclosure.

DESCRIPTION OF EMBODIMENTS

With the development of the 5th-generation (5G), various multimedia services that require multiple data volumes and short time delays have been applied, such as interactive services including cloud gaming, VR, AR, MR, XR, CR, and the like.

Figure 1:
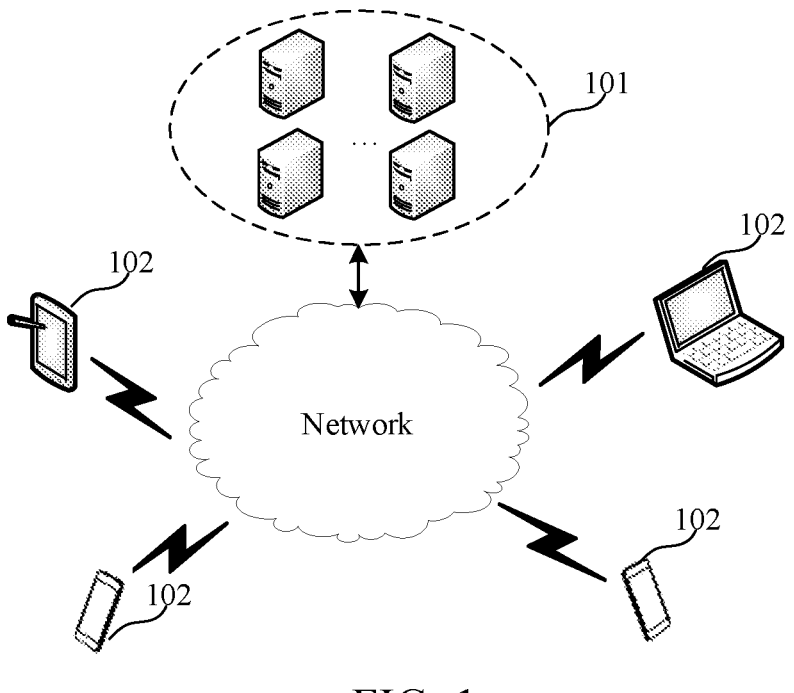
FIG. 1 is a schematic diagram of a system architecture provided in an embodiment of this disclosure.

For example, in a cloud gaming scenario shown in FIG. 1, a cloud server 101 is configured to run cloud gaming, and the cloud server 101 may render a gaming picture, perform coding processing on an audio signal and the rendered image, and finally transmit the coded data obtained by coding processing to each gaming client 102 through a network. The gaming client 102 may be user equipment (UE) with a basic streaming media playback capability, human-computer interaction capability, communication capability, and the like, such as smart phones, tablet personal computers, notebook computers, desk computers, smart televisions, smart appliances, and terminals. The terminals may be vehicle-mounted terminals or aircraft-mounted terminals, for example. Alternatively, the gaming client 102 may be an application running in a terminal device. In an example, the gaming client 102 may decode the coded data transmitted by the cloud server 101 to obtain analog audio and video signals and play the analog audio and video signals.

It is to be understood that FIG. 1 only exemplarily represents a system architecture of a cloud gaming system, but does not limit the specific architecture of the cloud gaming system. For example, in other embodiments, the cloud gaming system may further include a backend server configured for scheduling, and the like. Moreover, the cloud server 101 may be an independent physical server, a server cluster or distributed system including a plurality of physical servers, or a cloud server that provides basic cloud computing services, such as cloud services, cloud databases, cloud computing, cloud functions, cloud storage, network services, cloud communications, middleware services, domain name services, security services, content delivery networks (CDNs), big data and artificial intelligence platforms. The gaming client 102 and the cloud server 101 may be directly or indirectly connected in a wired or wireless communication mode, which is not limited in this disclosure.

Figure 2:
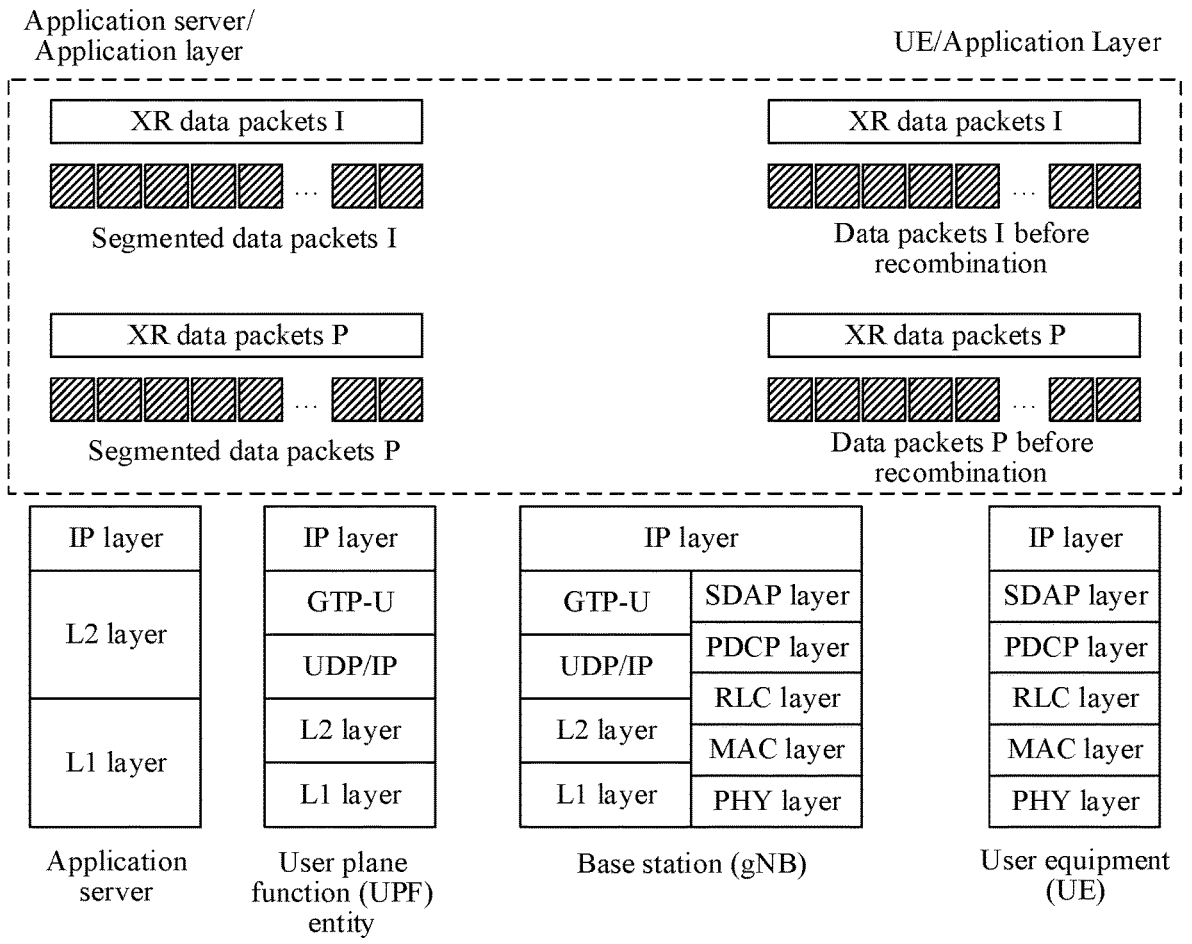
FIG. 2 is a schematic diagram of a transmission process of multimedia data packets provided in an embodiment of this disclosure.

In the various multimedia-based interactive service application scenarios mentioned above, due to a large size of a multimedia data packet, the multimedia data packet needs to be segmented into a plurality of data packets to be transmitted during transmission. Exemplarily, as shown in FIG. 2, in a 5G system, a user plane mainly includes an application server, a user plane function (UPF) entity, a base station (next generation nodeB (gNB)), and UE. The transmission of multimedia data packets is mainly in a downlink direction for some typical service scenarios. For example, multimedia data packets are transmitted from the application server to the UPF entity, and then transmitted to the UE through the gNB. During transmission, a multimedia data packet (taking an XR data packet as an example in FIG. 2) is segmented at the application layer of the application server, the segmented data packets are transmitted as IP packets from the application server to the UPF entity, then the 5G system transmits sub-data packets to the UE through PDU sessions, and the sub-data packets are submitted level by level from the protocol stack at the UE and recombined to recover the multimedia data packet.

In the system shown in FIG. 2, the L1 layer refers to a physical layer which is configured to ensure that the original data may be transmitted on various physical media; the L2 layer refers to a data link layer, and the data link layer provides services to the network layer on the basis of the services provided by the physical layer; the Internet protocol (IP) layer is the network layer for achieving data transmission between two end systems; the UDP is user datagram protocol; the GTP-U is general packet radio service (GPRS) tunneling protocol; the PHY is the abbreviation for physical; the MAC is media access control; the RLC is radio link control; the PDCP is packet data convergence protocol; and the SDAP is service data adaptation protocol.

As mentioned above, for multimedia services, it is common to segment a frame of multimedia data packet into a plurality of data packets to be transmitted. However, when these data packets are transmitted in the network, factors such as changes in radio resources and competition between a large number of service flows in the network may cause jitter in the transmission delay of the data packets. The jitter may bring loss to user experience for interactive multimedia services, especially high-quality audios and videos as well as strong interactive services such as cloud gaming (unable to use the caching technology to cope with the network jitter).

However, in the related technology, a service layer is unable to obtain the jitter situation of the current network, and there is no special jitter parameter in quality of service (QoS) parameters of the network to constrain the processing behavior of each network element. There is no optimization mechanism for jitter in PDU session management and user plane processing mechanisms for multimedia services. Embodiments of this disclosure propose a data transmission solution in which an application function (AF) entity (such as an application server) and a core network element perform interaction of network performance statistical parameters associated with delay jitter to determine whether to start jitter optimization. If the jitter optimization is started, it directly or indirectly affects the generation of corresponding policy rules and configuration of parameters in the core network element, so that the transmission of service data packets achieves the goal of reducing jitter to improve the user experience.

The implementation details of the technical solutions in the embodiments of this disclosure are described in detail below.

FIG. 3 is a flowchart of a data transmission method provided in an embodiment of this disclosure. The data transmission method may be performed by an application layer device, such as an AF entity. Referring to FIG. 3, the data transmission method may include step S310 to step S330.

In step S310, delay jitter characteristics of service data packets are obtained in a transmission process, the delay jitter characteristics being used for representing the changing situation of the transmission delay of the service data packets.

In some embodiments, an AF entity obtains delay jitter characteristics of service data packets counted and reported by a UPF entity. For example, an AF entity may transmit indication information to a UPF entity to indicate (or cause) the UPF entity to count and report delay jitter characteristics of service data packets in a PDU session, where the PDU session is used for transmitting service data packets. It is to be understood that the delay jitter characteristics can be used for representing the changing situation of the transmission delay of service data packets. For example, in a transmission process of service data packets, the transmission delay of the service data packets may be counted every set time (such as 1 second, 30 seconds, 1 minute, or the like), so that the changing situation of the transmission delay of the service data packets may be obtained.

The changing situation of the transmission delay may include at least one of the change frequency and change amplitude of the transmission delay. The change frequency may represent whether the statistical value of the transmission delay changes frequently, and if the statistical value changes frequently, it indicates that the jitter of the network state is larger. The change amplitude may represent the amplitude of change of the statistical value of the transmission delay (such as variance), and if the change amplitude is larger, it indicates that the jitter of the network state is larger.

In step S320, whether jitter optimization is needed (or to be performed) is determined according to the delay jitter characteristics and delay jitter requirements of the service data packets.

In some embodiments, the delay jitter requirements of the service data packets may be obtained directly by the AF entity, or may be obtained by the UE and transmitted to the AF entity. For example, the UE transmits the delay jitter characteristics to the AF entity by means of over the top (OTT).

In some embodiments, if it is determined that the change of the transmission delay of the service data packets exceeds a change threshold required by the delay jitter requirements according to the delay jitter characteristics, it is determined that the jitter optimization is needed. If the change of the transmission delay of the service data packets does not exceed the change threshold required by the delay jitter requirements, the jitter optimization is not needed.

In an example, the object optimized by the jitter optimization is a jitter processing policy of a core network element. When the jitter optimization is not needed, the current jitter processing policy of the core network element is maintained. When the jitter optimization is needed, the jitter processing policy of the core network element is updated.

For example, in a case that the changing situation of the transmission delay includes the change frequency of the transmission delay, if the change frequency of the transmission delay exceeds the highest change frequency required by the delay jitter requirements, it may be determined that the jitter optimization is needed.

In a case that the changing situation of the transmission delay includes the change amplitude of the transmission delay, if the change amplitude of the transmission delay exceeds the highest change amplitude required by the delay jitter requirements, it may be determined that the jitter optimization is needed.

In a case that the changing situation of the transmission delay includes the change frequency and change amplitude of the transmission delay, if the change frequency of the transmission delay exceeds the highest change frequency required by the delay jitter requirements, or the change amplitude of the transmission delay exceeds the highest change amplitude required by the delay jitter requirements, it may be determined that the jitter optimization is needed. Alternatively, when the change frequency of the transmission delay exceeds the highest change frequency required by the delay jitter requirements, and the change amplitude of the transmission delay exceeds the highest change amplitude required by the delay jitter requirements, it is determined that the jitter optimization is needed.

In some embodiments, the delay jitter requirements of the service data packets may be determined according to at least one of (or one or more of) the following factors: the tolerance of the service data packets to the delay jitter, the size of a playback buffer corresponding to the service data packets, the playable duration of the playback buffer corresponding to the service data packets, service characteristics corresponding to the service data packets, the transmitting end capability information of the service data packets, the receiving end capability information of the service data packets, or coding and decoding algorithms corresponding to the service data packets.

In an example, the lower the tolerance of the service data packets to the delay jitter, the higher the delay jitter requirements of the service data packets (such as the lower the required highest change frequency, the lower the required highest change amplitude). Conversely, the higher the tolerance of the service data packets to the delay jitter, the lower the delay jitter requirements of the service data packets. For example, for cloud gaming data with higher real-time requirements, the tolerance to the delay jitter is lower; and for backup data with lower real-time requirements, the tolerance to the delay jitter is higher.

In an example, the larger the playback buffer corresponding to the service data packets, the lower the difficulty in relieving jitter. Conversely, the smaller the playback buffer corresponding to the service data packets, the higher the difficulty in relieving jitter. Therefore, the size of the playback buffer is inversely correlated with the level of the delay jitter requirements, that is, the larger the playback buffer, the lower the delay jitter requirements. The smaller the playback buffer, the higher the delay jitter requirements.

In an example, the size of the playback buffer is correlated with the playable duration corresponding to the cached multimedia data packets, that is, the larger the playback buffer, the longer the playable duration; and the smaller the playback buffer, the shorter the playable duration. Therefore, the playable duration of the playback buffer is inversely correlated with the level of the delay jitter requirements, that is, the longer the playable duration of the playback buffer, the lower the delay jitter requirements; and the shorter the playable duration of the playback buffer, the higher the delay jitter requirements.

In an example, the service characteristics corresponding to the service data packets may determine the delay jitter requirements of the service data packets to a certain extent. For example, if the service characteristics corresponding to the service data packets are strong interactive services or real-time interactive services, it indicates that the delay jitter requirements of the service data packets are higher. If the service characteristics corresponding to the service data packets are services without excessive real-time requirements (such as data backup services), it indicates that the delay jitter requirements of the service data packets are lower.

In an example, the transmitting end capability information and receiving end capability information of the service data packets may be the handling capability of a transmitting end and a receiving end to the delay jitter. In some embodiments, the transmitting end capability information includes a support situation of the transmitting end for a solution of relieving delay jitter, and the receiving end capability information includes a support situation of the receiving end for a solution of relieving delay jitter. For example, if the solution of relieving delay jitter includes multi-channel fusion, the transmitting end capability information and the receiving end capability information include support situations for multi-channel receiving and transmitting capabilities.

For example, if the transmitting end has a parallel transmitting capability and the receiving end may also receive multiple channels of data for processing at the same time, the transmitting end may transmit the same service data packets in parallel through multiple channels (such as 3 channels), so that the receiving end may perform de-duplicated fusion processing on the received service data packets through multiple channels. In this case, if the handling capability of the receiving end and the transmitting end to the delay jitter is stronger, the corresponding delay jitter requirements are lower. Conversely, if the handling capability of the receiving end and the transmitting end to the delay jitter is poor, the corresponding delay jitter requirements are higher.

In an example, coding and decoding algorithms corresponding to service data packets may represent whether discarding a certain/some data packets will affect the recovery of overall data packets. If discarding a certain/some data packets will not affect the recovery of overall data packets (using redundant error correction algorithms and correctly received data packets for recovery of data packets), during transmission of this/these data packets, even if there is delay jitter, it will not have a significant impact, which indicates that the delay jitter requirements are lower. Conversely, if discarding a certain/some data packets will affect the recovery of overall data packets, during transmission of this/these data packets, the requirements for delay jitter are higher.

Continuing to refer to FIG. 3, in step S330, indication information is transmitted to a core network element in a case that it is determined that the jitter optimization is needed to indicate the core network element to start delay jitter optimization.

In some embodiments, if it is determined that the jitter optimization is needed, an application layer device (such as AF) may transmit indication information to a policy control function (PCF) entity. The modes of transmitting the indication information to the PCF entity by the application layer device include: (1) the application layer device directly transmits the indication information to the PCF entity; and (2) the application layer device transmits the indication information to a network exposure function (NEF) entity, and then, the NEF entity forwards the indication information to the PCF entity.

In some embodiments, the indication information has a notification function for notifying the core network element for optimization. In other embodiments, the indication information has notification and guide functions for notifying the core network element and guiding an optimization direction and optimization objectives. For example, the indication information only includes an indication position, or the indication information includes an indication position and optimization parameters.

In some embodiments, starting the delay jitter optimization by the core network element may include generating (or setting) policy information for QoS flow parameters of a re-established PDU session according to the indication information (requiring re-establishment of the PDU session), or generating policy information for modifying QoS flow parameters corresponding to the established PDU session according to the indication information (continuing to use the established PDU session without the need for re-establishment) to reduce the delay jitter.

According to the technical solution in the embodiment shown in FIG. 3, in the transmission process of the service data packets, delay jitter optimization may be performed on a network in time according to the delay jitter characteristics of the service data packets to ensure that the network delay jitter during transmission of the service data packets is within an acceptable range. As a result, the network transmission quality of the service data packets may be improved, which is favorable for enhancing the experience brought by services.

FIG. 4 is a flowchart of a data transmission method provided in another embodiment of this disclosure. The data transmission method may be performed by an application layer device, such as an AF entity. Referring to FIG. 4, the data transmission method may include step S410 and step S320 and step S330 shown in FIG. 3.

In step S410, indication information for establishing a PDU session is transmitted to the core network element to indicate the core network element to establish the PDU session for transmitting the service data packets. The indication information is transmitted to a UPF entity to indicate the UPF entity to count and report the delay jitter characteristics of the service data packets in the PDU session.

The application layer device (such as AF entity) may trigger the core network element to establish a PDU session before transmitting the service data packets, and then interact with the access network side through the core network element to count the delay jitter characteristics of the service data packets; and then, the delay jitter characteristics are reported to the application layer device through the UPF entity (belonging to the core network element).

According to the technical solution in the embodiment shown in FIG. 4, the application layer device may obtain the delay jitter characteristics of the service data packets in time according to requirements to perform delay jitter optimization on a network in time, which is favorable for improving the network transmission quality of the service data packets. For exemplary implementation details of the other steps shown in FIG. 4, reference may be made to the technical solution in the foregoing embodiment.

FIG. 5 is a flowchart of a data transmission method provided in another embodiment of this disclosure. The data transmission method may be performed by an application layer device, such as an AF entity. Referring to FIG. 5, the data transmission method may include step S510 and step S520 and step S310 to step S330 shown in FIG. 3.

In step S510, jitter requirement information is generated according to service attribute information corresponding to the service data packets.

In some embodiments, an application layer device (such as an AF entity) may directly generate initial jitter requirement information according to the service attribute information corresponding to the service data packets to be transmitted, and then, transmit the initial jitter requirement information to the core network element for delay jitter processing. For example, for strong interactive cloud gaming data packets, the application layer device may generate low jitter requirement information (that is, require lower delay jitter), and transmit the low jitter requirement information to the core network element.

In step S520, the jitter requirement information is transmitted to the core network element, the jitter requirement information being used for indicating the core network element to configure a jitter processing policy based on the jitter requirement information to transmit the service data packets based on the jitter processing policy.

In some embodiments, after receiving the jitter requirement information, the core network element may adjust the policy information of QoS flow parameters when establishing a PDU session for transmitting service data packets, or may achieve the requirement for low delay jitter by modifying the policy information of QoS flow parameters corresponding to the established PDU session. The foregoing process is the initialization process of the jitter processing policy.

In an example, after transmitting the jitter requirement information to the core network element, the application layer device may obtain the delay jitter characteristics reported by the UPF entity. In some embodiments, the core network element may interact with the access network side to count the delay jitter characteristics of the service data packets, and then, the delay jitter characteristics are reported to the application layer device through the UPF entity.

According to the technical solution in the embodiment shown in FIG. 5, the application layer may first generate initial jitter requirement information, and then determine whether to perform jitter optimization according to the delay jitter characteristics of the service data packets, so that delay jitter optimization may be performed on a network in time, which is favorable for improving the network transmission quality of the service data packets. For exemplary implementation details of the other steps shown in FIG. 5, reference may be made to the technical solution in the foregoing embodiment.

The above explains the technical solutions in the embodiments of this disclosure from the perspective of an application layer. The following further explains the implementation details of the technical solutions in the embodiments of this disclosure from the perspective of a core network element (such as a PCF entity).

FIG. 6 is a flowchart of a data transmission method provided in an embodiment of this disclosure. The data transmission method may be performed by a core network element, such as a PCF entity. Referring to FIG. 6, the data transmission method may include step S610 to step S630.

In step S610, indication information transmitted by an application layer device is received, the indication information being used for indicating the start of delay jitter optimization, and the indication information being transmitted after determining that the jitter optimization is needed according to the delay jitter requirements and delay jitter characteristics of service data packets.

In an example, the application layer device is an AF entity.

In some embodiments, if the AF entity determines that the change of the transmission delay of the service data packets exceeds the change threshold required by the delay jitter requirements according to the delay jitter characteristics, it is determined that the jitter optimization is needed, so that the indication information may be generated and transmitted to the PCF. For an exemplary process, reference may be made to the technical solution in the foregoing embodiment.

In step S620, policy information for reducing delay jitter is generated according to the indication information.

In some embodiments, the core network element may re-establish a PDU session and then generate policy information for QoS flow parameters of the re-established PDU session according to the indication information; or may generate policy information for modifying QoS flow parameters corresponding to the established PDU session according to the indication information.

In step S630, the policy information is transmitted to an SMF entity to enable the SMF entity to configure processing policies for reducing delay jitter to other network elements.

In some embodiments, the SMF entity may generate N4 rules and UE contexts on a radio access network side (such as an NG-radio access network (NG-RAN)) for reflecting the reduction of delay jitter according to the policy information transmitted by the PCF entity, and then configure the N4 rules to a UPF entity and configure the UE contexts to a base station. The SMF entity may also generate UE side rules for reflecting the reduction of delay jitter, and then configure the UE side rules to UE.

According to the technical solution in the embodiment shown in FIG. 6, in the transmission process of the service data packets, delay jitter optimization may be performed on a network in time according to the delay jitter characteristics of the service data packets to ensure that the network delay jitter during transmission of the service data packets is within an acceptable range. As a result, the network transmission quality of the service data packets may be improved, which is favorable for enhancing the experience brought by services.

FIG. 7 is a flowchart of a data transmission method provided in another embodiment of this disclosure. The data transmission method may be performed by a core network element, such as a PCF entity. Referring to FIG. 7, the data transmission method may include step S710 and step S720 and step S610 to step S630 shown in FIG. 6.

In step S710, jitter requirement information transmitted by an AF entity is received, the jitter requirement information being generated by the AF entity according to service attribute information corresponding to the service data packets.

In some embodiments, an application layer device (such as an AF entity) may directly generate initial jitter requirement information according to the service attribute information corresponding to the service data packets to be transmitted, and then, transmit the initial jitter requirement information to the core network element for delay jitter processing. For example, for strong interactive cloud gaming data packets, the application layer may generate low jitter requirement information (that is, require lower jitter), and transmit the low jitter requirement information to the core network element.

In step S720, a jitter processing policy is configured according to the jitter requirement information, and the jitter processing policy is transmitted to the SMF entity to enable the SMF entity to configure the corresponding jitter processing policies to other network elements to transmit the service data packets based on the jitter processing policy.

In some embodiments, the SMF entity may generate N4 rules and UE contexts on an RAN side for reflecting the need for low delay jitter according to the jitter processing policy transmitted by the PCF entity, and then configure the N4 rules to a UPF entity and configure the UE contexts to a base station, thereby completing the initialization of the jitter processing policy. The SMF entity may also generate UE side rules for reflecting the need for low delay jitter, and then configure the UE side rules to UE.

According to the technical solution in the embodiment shown in FIG. 7, the application layer may first generate initial jitter requirement information, and then determine whether to perform jitter optimization according to the delay jitter characteristics of the service data packets, so that delay jitter optimization may be performed on a network in time, which is favorable for improving the network transmission quality of the service data packets. For exemplary implementation details of the other steps shown in FIG. 7, reference may be made to the technical solution in the foregoing embodiment.

The above explains the technical solutions in the embodiments of this disclosure from the perspective of an application layer and a core network element respectively. The following explains the implementation details of the technical solutions in the embodiments of this disclosure again with exemplary embodiments.

In an embodiment of this disclosure, an application layer device (AF entity or UE) may obtain jitter correlated characteristic requirements (that is, delay jitter requirements) of services according to the following aspects:

1. Tolerance of Service Characteristics to Jitter

For example, high-quality audio data and strong interactive cloud gaming data have low tolerance to jitter, which indicates that delay jitter requirements are higher.

In some embodiments, the tolerance may be represented by a tolerance level.

2. Application Layer Playback Setting

Delay jitter requirements may be determined according to the size of a playback buffer of an application layer, that is, the smaller the playback buffer, the greater the difficulty in relieving jitter, and the higher the delay jitter requirements.

The size of the playback buffer of the application layer may be correlated with service characteristics. For example, interactive cloud gaming may be provided with a small playback buffer. At the same time, the size of the playback buffer of the application layer may also be converted into a playable time, and the two are positively correlated.

3. Capability Configuration of Application Server and Terminal Device

The capability configuration of a terminal device and an application server may include but is not limited to the handling capability to jitter in the process of processing a correlated data packet set (PDU set).

4. Coding and Decoding Algorithms

Different coding and decoding characteristics may have different capabilities to relieve jitter. For example, coding and decoding algorithms may represent whether discarding a certain/some data packets will affect the recovery of overall data packets. If discarding a certain/some data packets will not affect the recovery of overall data packets, during transmission of this/these data packets, even if there is delay jitter, it will not have a significant impact, which indicates that the delay jitter requirements are lower. Conversely, if discarding a certain/some data packets will affect the recovery of overall data packets, during transmission of this/these data packets, the requirements for delay jitter are higher.

It is to be understood that if the jitter correlated characteristic requirements are obtained from the application layer of the UE, the jitter correlated characteristic requirements may be transmitted to the application server by means of OTT, and interact with the core network element through the application server. If the jitter correlated characteristic requirements are obtained from the application layer of the application server, the characteristics may be directly used for interacting with the core network element.

In some embodiments, the AF entity may openly obtain delay jitter characteristics of a network through network capabilities. In an example, the AF entity may trigger core network elements to establish a specific PDU session, through the interaction of network elements such as a PCF entity, an SMF entity and an AMF entity and an NG-RAN, 5GC network elements (such as a UPF entity and a gNB) may count the delay jitter characteristics of data packets, and then, the delay jitter characteristics are reported to the AF entity through the UPF entity or other network elements.

In some embodiments, after obtaining the delay jitter characteristics of the network, the AF entity may determine whether to trigger a signaling process for reducing jitter based on the requirements of the application layer for jitter in conjunction with the delay jitter characteristics of the network obtained by counting. If the AF entity starts the process of reducing jitter, the AF entity may interact with the PCF entity to generate corresponding policy control and charging (PCC) rules, so as to achieve the reduction of jitter in different modes of re-establishing a PDU session or modifying QoS flow parameters in the PDU session.

Figure 8:
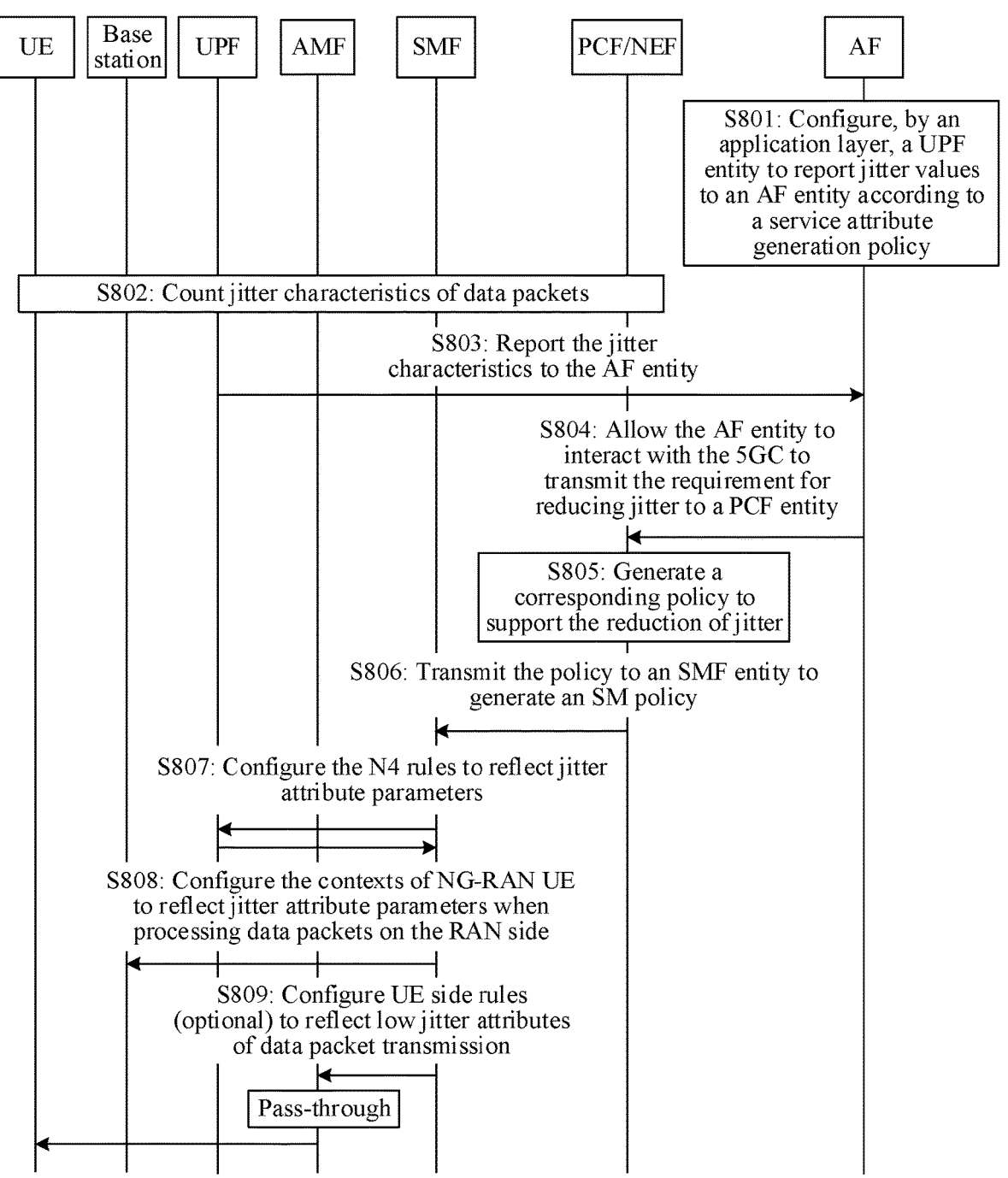
FIG. 8 is a flowchart of a data transmission method provided in an embodiment of this disclosure.

Based on the technical solution in the foregoing embodiment, as shown in FIG. 8, a data transmission method provided in an embodiment of this disclosure includes steps as follows.

In step S801, a UPF entity is configured by an application layer to report delay jitter values to an AF entity according to a service attribute generation policy. In an example, the application layer may indicate a 5GC to establish a PDU session according to service attributes, and indicate the UPF entity to report the delay jitter characteristics (that is, delay jitter values) obtained by counting to the AF entity.

In step S802, delay jitter characteristics of data packets are counted.

The UPF entity may cooperate with the NG-RAN and UE to measure the actual values of delay jitter, and then, the actual values are summarized to the UPF entity.

In step S803, the delay jitter characteristics are reported to the AF entity by the UPF entity.

In step S804, the AF entity is allowed to interact with the 5GC to transmit the requirement for reducing jitter to a PCF entity.

After the AF entity receives the delay jitter characteristics reported by the UPF entity, if it is determined that the delay jitter needs to be reduced, the requirement for reducing jitter may be transmitted to the PCF entity (directly transmitted to the PCF entity, or first transmitted to an NEF entity and then forwarded to the PCF entity through the NEF entity).

In step S805, a corresponding policy is generated to support the reduction of jitter.

The PCF entity may perform mapping and generate a corresponding policy, including indication for the reduction of jitter. For example, in the generated policy, a new parameter for indicating jitter is added, and a value is set, that is, it does not only depend on the value of a 5G QoS identifier (5QI); or the requirement for reducing jitter is mapped to the value of a specific 5QI (if the specific 5QI added to a 5G system subsequently can support low delay jitter).

In step S806, the generated policy is transmitted by the PCF entity to an SMF entity to generate an SM policy.

The SMF entity may further process the policy rules generated by the PCF entity into N4 rules of the UPF entity (including parameters that require low delay jitter), and SM rules of the NG-RAN and UE (including parameters that require low delay jitter).

In step S807, the N4 rules to the UPF entity are configured by the SMF entity to reflect jitter attribute parameters.

The SMF entity may interact with the UPF entity to configure the N4 rules to the UPF entity through an N4 interface, and after this step, the UPF entity may be combined with a data packet header on a user plane interface to perform data packet processing for the reduction of delay jitter. For example, whether data packets have a correlation may be determined according to the data packet header, and it is possible to determine which data packets are discardable data packets, thereby performing data packet processing for the reduction of delay jitter (such as discarding discardable data packets in a series of data packets having a correlation).

In step S808, the contexts of NG-RAN UE are configured to reflect jitter attribute parameters when processing data packets on the RAN side. That is, the configuration parameters of the SMF entity are transmitted to the NG-RAN through an AMF entity, so that the base station obtains a processing policy with smaller delay jitter.

In step S809, UE side rules (this step may be optional) are configured to reflect low jitter attributes of data packet transmission. That is, the configuration parameters of the SMF entity are transmitted to the UE through the AMF entity, so that the UE obtains a processing policy with smaller delay jitter.

The AF entity may generate PCC rules directly according to the jitter attributes of services, and then establish a PDU session. After obtaining the service jitter characteristics by real-time counting, the AF entity determines whether to further reduce the jitter.

Figure 9:
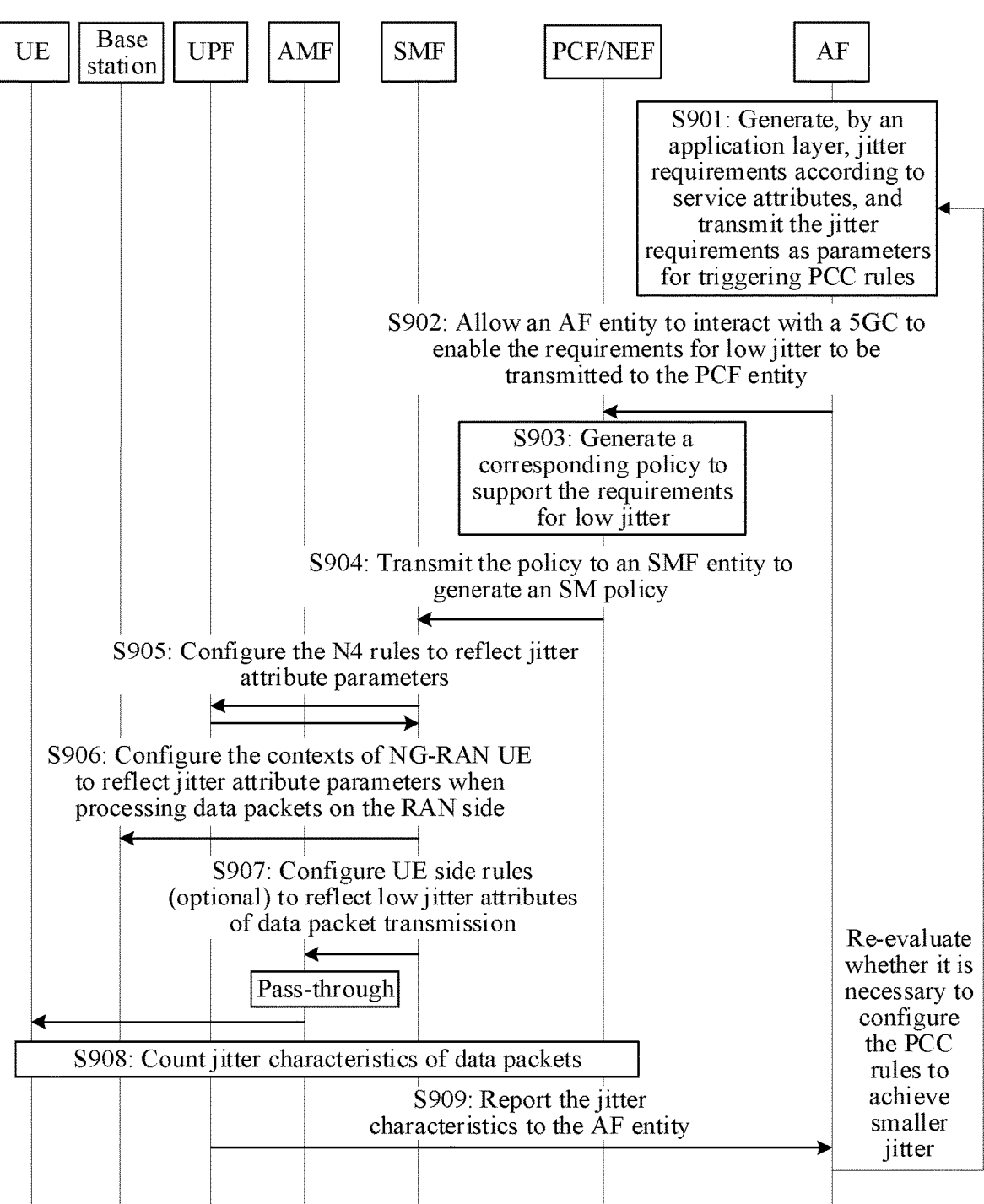
FIG. 9 is a flowchart of a data transmission method provided in another embodiment of this disclosure.

As shown in FIG. 9, a data transmission method provided in another embodiment of this disclosure includes steps as follows.

In step S901, requirements for low delay jitter are generated by an application layer according to service attributes, and the requirements are transmitted as parameters for triggering PCC rules to a PCF entity.

In step S902, an AF entity is allowed to interact with a 5GC to enable the requirements for low delay jitter to be transmitted to the PCF entity (directly transmitted to the PCF entity, or first transmitted to an NEF entity and then forwarded to the PCF entity through the NEF entity).

In step S903, a corresponding policy is generated to support the reduction of jitter.

In an example, the PCF entity may perform mapping and generate a corresponding policy, including indication for low delay jitter. For example, in the generated policy, a new parameter for indicating jitter is added, and a value is set, that is, it does not only depend on the value of a 5QI; or the requirements for low delay jitter are mapped to the value of a specific 5QI (if the specific 5QI added to a 5G system subsequently can support low delay jitter).

In step S904, the generated policy is transmitted by the PCF entity to an SMF entity to generate an SM policy.

In an example, the SMF entity may further process the policy rules generated by the PCF entity into N4 rules of the UPF entity (including parameters that require low delay jitter), and SM rules of the NG-RAN and UE (including parameters that require low delay jitter).

In step S905, the N4 rules to the UPF entity are configured by the SMF entity to reflect jitter attribute parameters.

In an example, the SMF entity interacts with the UPF entity to configure the N4 rules to the UPF entity through an N4 interface, and after this step, the UPF entity may be combined with a data packet header on a user plane interface to perform data packet processing for low delay jitter. For example, whether data packets have a correlation may be determined according to the data packet header, and it is possible to determine which data packets are discardable data packets, thereby performing data packet processing for low delay jitter (such as discarding discardable data packets in a series of data packets having a correlation).

In step S906, the contexts of NG-RAN UE are configured to reflect jitter attribute parameters when processing data packets on the RAN side. That is, the configuration parameters of the SMF entity are transmitted to the NG-RAN through an AMF entity, so that the base station obtains a processing policy with smaller delay jitter.

In step S907, UE side rules (this step may be optional) are configured to reflect low delay jitter attributes of data packet transmission. That is, the configuration parameters of the SMF entity are transmitted to the UE through the AMF entity, so that the UE obtains a processing policy with smaller delay jitter.

In step S908, delay jitter characteristics of data packets are counted after starting the transmission of data packets. The UPF entity may cooperate with the NG-RAN and UE to measure the actual values of delay jitter, and then, the actual values are summarized to the UPF entity.

In step S909, the delay jitter characteristics are reported by the UPF entity to the AF entity, after receiving the delay jitter characteristics reported by the UPF entity, the delay jitter characteristics are compared by the AF entity with the delay jitter requirements of services, and if it is determined that the delay jitter needs to be reduced, the requirement for reducing jitter is transmitted to the PCF entity to trigger a policy for reducing the delay jitter.

According to the technical solution in the foregoing embodiment of this disclosure, delay jitter optimization may be performed on a network in time according to the delay jitter characteristics of the service data packets to ensure that the network delay jitter during transmission of the service data packets is within an acceptable range. As a result, the network transmission quality of the service data packets may be improved, which is favorable for enhancing the experience brought by services.

The following introduces apparatus embodiments of this disclosure, and the apparatus embodiments may be used for performing the data transmission methods in the foregoing embodiments of this disclosure. For details undisclosed in the apparatus embodiments of this disclosure, refer to the embodiments of the foregoing data transmission method in this disclosure.

Figures 10, 11:
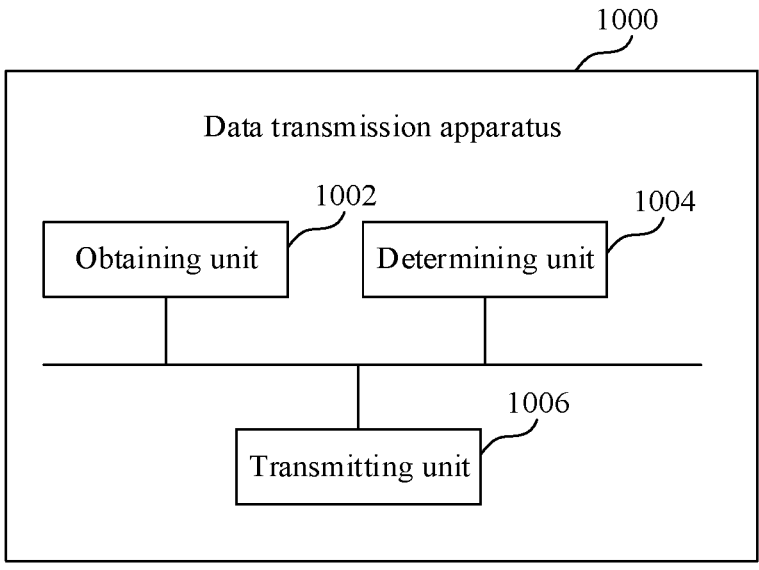
FIG. 10 is a block diagram of a data transmission apparatus provided in an embodiment of this disclosure.
FIG. 11 is a block diagram of a data transmission apparatus provided in another embodiment of this disclosure.

FIG. 10 is a block diagram of a data transmission apparatus provided in an embodiment of this disclosure. The data transmission apparatus 1000 includes: an obtaining unit 1002, a determining unit 1004, and a transmitting unit 1006.

The obtaining unit 1002 is configured to obtain delay jitter characteristics of service data packets in a transmission process, and the delay jitter characteristics are used for representing the changing situation of the transmission delay of the service data packets. The determining unit 1004 is configured to determine whether jitter optimization is needed according to the delay jitter characteristics and delay jitter requirements of the service data packets. The transmitting unit 1006 is configured to transmit indication information to a core network element in a case that it is determined that the jitter optimization is needed to indicate the core network element to start delay jitter optimization.

In some embodiments of this disclosure, based on the foregoing solution, the obtaining unit 1002 is configured to: transmit indication information for establishing a PDU session to the core network element to indicate the core network element to establish the PDU session for transmitting the service data packets; and transmit the indication information to a UPF entity to indicate the UPF entity to count and report the delay jitter characteristics of the service data packets in the PDU session.

In some embodiments of this disclosure, based on the foregoing solution, the data transmission apparatus 1000 further includes: a generation unit, configured to generate jitter requirement information according to the service attribute information corresponding to the service data packets before obtaining the delay jitter characteristics of the service data packets in the transmission process; and the transmitting unit 1006 is further configured to: transmit the jitter requirement information to the core network element, the jitter requirement information being used for indicating the core network element to configure a jitter processing policy based on the jitter requirement information to transmit the service data packets based on the jitter processing policy.

In some embodiments of this disclosure, based on the foregoing solution, the obtaining unit 1002 is configured to: obtain the delay jitter characteristics reported by the UPF entity after transmitting the jitter requirement information to the core network element.

In some embodiments of this disclosure, based on the foregoing solution, the determining unit 1004 is configured to: determine that the jitter optimization is needed in a case that it is determined that the change of the transmission delay of the service data packets exceeds a change threshold required by the delay jitter requirements according to the delay jitter characteristics.

In some embodiments of this disclosure, based on the foregoing solution, the delay jitter requirements of the service data packets are determined according to at least one of the following factors: the tolerance of the service data packets to the delay jitter, the size of a playback buffer corresponding to the service data packets, the playable duration of the playback buffer corresponding to the service data packets, service characteristics corresponding to the service data packets, the transmitting end capability information of the service data packets, the receiving end capability information of the service data packets, and coding and decoding algorithms corresponding to the service data packets.

In some embodiments of this disclosure, based on the foregoing solution, in a case that the delay jitter requirements of the service data packets are determined according to the size of the playback buffer corresponding to the service data packets, the size of the playback buffer is inversely correlated with the level of the delay jitter requirements; and in a case that the delay jitter requirements of the service data packets are determined according to the playable duration of the playback buffer corresponding to the service data packets, the playable duration is inversely correlated with the level of the delay jitter requirements.

FIG. 11 is a block diagram of a data transmission apparatus provided in an embodiment of this disclosure. The data transmission apparatus 1100 includes: a receiving unit 1102, a generation unit 1104, and a processing unit 1106.

The receiving unit 1102 is configured to receive indication information transmitted by an application layer device, the indication information is used for indicating the start of delay jitter optimization, and the indication information is transmitted by the application layer device after determining that the jitter optimization is needed according to delay jitter requirements and delay jitter characteristics of service data packets. The generation unit 1104 is configured to generate policy information for reducing delay jitter according to the indication information. The processing unit 1106 is configured to transmit the policy information to an SMF entity to enable the SMF entity to configure processing policies for reducing delay jitter to other network elements.

In some embodiments of this disclosure, based on the foregoing solution, the receiving unit 1102 is further configured to: receive the jitter requirement information transmitted by the AF entity before receiving the indication information transmitted by the application layer device for indicating the start of delay jitter optimization, the jitter requirement information being generated by the AF entity according to the service attribute information corresponding to the service data packets; and the processing unit 1106 is further configured to: configure a jitter processing policy according to the jitter requirement information, and transmit the jitter processing policy to the SMF entity to enable the SMF entity to configure the corresponding jitter processing policies to other network elements to transmit the service data packets based on the jitter processing policy.

In some embodiments of this disclosure, based on the foregoing solution, the generation unit 1104 is configured to: generate policy information for QoS flow parameters of a re-established PDU session according to the indication information; or generate policy information for modifying QoS flow parameters corresponding to the established PDU session according to the indication information.

Figure 12:
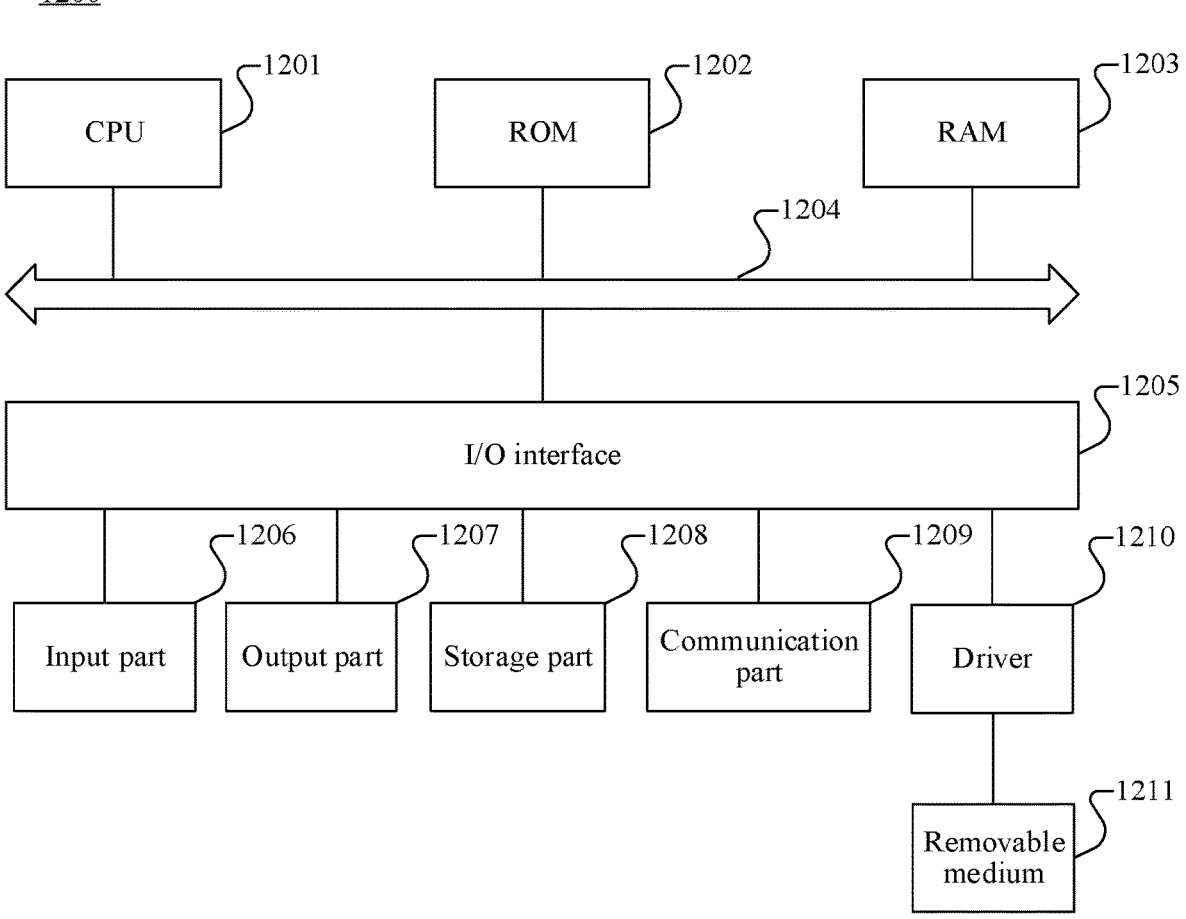
FIG. 12 is a schematic structural diagram of an electronic device provided in an embodiment of this disclosure.

FIG. 12 is a schematic structural diagram of an electronic device provided in an embodiment of this disclosure.

As shown in FIG. 12, an electronic device 1200 includes processing circuitry, such as a central processing unit (CPU) 1201. For example, the CPU 1201 may perform various suitable actions and processing based on a program stored in a read-only memory (ROM) 1202 or a program loaded from a storage part 1208 into a random access memory (RAM) 1203, for example, perform the methods described in the foregoing embodiments. The RAM 1203 further stores various programs and data required for system operations. The CPU 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard, a mouse, or the like; an output part 1207 including a cathode ray tube (CRT), a liquid crystal display (LCD), a speaker, or the like; a storage part 1208 including a hard disk, or the like; and a communication part 1209 including a network interface card such as a local area network (LAN) card or a modem. The communication part 1209 performs communication processing by using a network such as the Internet. A driver 1210 is also connected to the I/O interface 1205 as required. A removable medium 1211, such as a magnetic disk, an optical disk, a magneto-optical disk, or a semiconductor memory, is installed on the driver 1210 as required, so that a computer program read from the removable medium is installed into the storage part 1208 as required.

According to the embodiments of this disclosure, the processes described above by referring to the flowcharts may be implemented as computer software programs. For example, an embodiment of this disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 1209, and/or installed from the removable medium 1211. When the computer program is executed by the CPU 1201, the various functions defined in the system of this disclosure are executed.

It is to be understood that the computer-readable medium shown in the embodiments of this disclosure may be a computer-readable signal medium or a computer-readable storage medium or any combination of the two. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include but is not limited to: an electrical connector having one or more wires, a portable computer disk, a hard disk, an RAM, an ROM, an erasable programmable read only memory (EPROM), a flash memory, an optical fiber, a portable compact disc read-only memory (CD-ROM), an optical storage device, a magnetic storage device, or any appropriate combination thereof. In this disclosure, the computer-readable storage medium may be any tangible medium containing or storing a program, and the program may be used by or used in combination with an instruction execution system, an apparatus, or a device. In this disclosure, the computer-readable signal medium may include a data signal transmitted in a baseband or as part of a carrier, and stores a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: a wireless medium, a wired medium, or any suitable combination thereof.

The flowcharts and block diagrams in the accompanying drawings illustrate possible system architectures, functions and operations that may be implemented by a system, a method, and a computer program product according to various embodiments of this disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in the accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by a dedicated hardware-based system configured to perform a specified function or operation, or may be implemented by a combination of dedicated hardware and computer programs.

A related unit described in the embodiments of this disclosure may be implemented in a software manner, or may be implemented in a hardware manner, and the unit described can also be set in a processor. Names of the units do not constitute a limitation on the units in a specific case.

According to another aspect, this disclosure further provides a computer-readable medium, such as a non-transitory computer-readable storage medium. The computer-readable medium may be included in the electronic device described in the foregoing embodiments, or may exist alone and is not assembled in the electronic device. The foregoing computer-readable medium carries one or more computer programs, the one or more computer programs, when executed by one electronic device, causing the electronic device to implement the methods described in the foregoing embodiments.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

It should be understood that this disclosure is not limited to the precise structures described above and shown in the accompanying drawings, and various modifications and changes can be made without departing from the scope of this disclosure.

What is claimed is:

1. A method for data transmission, comprising:

receiving delay jitter characteristics of service data packets during transmission of the service data packets, the delay jitter characteristics indicating at least a change in transmission delay of the service data packets;

determining, by an application layer device, whether jitter optimization is to be performed according to the delay jitter characteristics and delay jitter requirements of the service data packets; and transmitting first indication information to a core network element when the jitter optimization is determined to be performed, the core network element being configured to start delay jitter optimization in response to the first indication information, wherein the jitter optimization is determined to be performed when the change in the transmission delay of the service data packets according to the delay jitter characteristics exceeds a change threshold required by the delay jitter requirements.

2. The method according to claim 1, further comprising:

determining the delay jitter requirements based at least on one of a type of service of the service data packets or receiving end capability information, wherein the first indication information includes at least one optimization parameter, the core network being configured to update a jitter processing policy of the core network element according to the at least one optimization parameter.

3. The method according to claim 1, wherein the receiving the delay jitter characteristics comprises:

transmitting second indication information for establishing a protocol data unit (PDU) session to the core network element, the core network element being configured to establish the PDU session for transmitting the service data packets in response to the second indication information; and transmitting third indication information to a user plane function (UPF) entity, the UPF entity being configured to count and report the delay jitter characteristics of the service data packets in the PDU session in response to the third indication information.

4. The method according to claim 1, further comprising:

generating jitter requirement information according to service attribute information corresponding to the service data packets; and transmitting the jitter requirement information to the core network element, the core network element being configured to set a jitter processing policy based on the jitter requirement information to transmit the service data packets based on the jitter processing policy.

5. The method according to claim 4, wherein the receiving the delay jitter characteristics comprises:

obtaining the delay jitter characteristics reported by a user plane function (UPF) entity after transmitting the jitter requirement information to the core network element.

6. The method according to claim 1, wherein the delay jitter requirements of the service data packets are determined according to at least one of:

a tolerance of the service data packets to delay jitter, a size of a playback buffer corresponding to the service data packets, a playable duration of the playback buffer corresponding to the service data packets, service characteristics corresponding to the service data packets, transmitting end capability information of the service data packets, receiving end capability information of the service data packets, or coding and decoding algorithms corresponding to the service data packets.

7. The method according to claim 6, wherein the delay jitter requirements of the service data packets are determined according to the size of the playback buffer corresponding to the service data packets, and the size of the playback buffer is inversely correlated with a level of the delay jitter requirements.

8. The method according to claim 6, wherein the delay jitter requirements of the service data packets are determined according to the playable duration of the playback buffer corresponding to the service data packets, and the playable duration is inversely correlated with a level of the delay jitter requirements.

9. A method for data transmission, the method comprising:

receiving first indication information indicating that jitter optimization is to be performed from an application layer device, the first indication information being transmitted by the application layer device based on a change in transmission delay of service data packets according to delay jitter characteristics exceeding a change threshold that is required by delay jitter requirements;

setting, by a core network element, policy information to reduce delay jitter according to the first indication information; and transmitting the policy information to a session management function (SMF) entity that is configured to set processing policies for reducing delay jitter to other network elements.

10. The method according to claim 9, further comprising:

receiving jitter requirement information from the application layer device, the jitter requirement information being generated by the application layer device according to service attribute information corresponding to the service data packets;

setting a jitter processing policy according to the jitter requirement information; and transmitting the jitter processing policy to the SMF entity that is configured to set the corresponding jitter processing policies to the other network elements to transmit the service data packets based on the jitter processing policy.

11. The method according to claim 9, wherein the setting the policy information comprises:

generating policy information for quality of service (QOS) flow parameters of a re-established PDU session according to the first indication information.

12. The method according to claim 9, wherein the setting the policy information comprises:

generating policy information for modifying QoS flow parameters corresponding to an established PDU session according to the first indication information.

13. The method according to claim 9, wherein the receiving the first indication information comprises:

receiving the first indication information from the application layer device through a network exposure function (NEF) entity.

14. A data transmission apparatus, comprising:

processing circuitry configured to:

receive delay jitter characteristics of service data packets during transmission of the service data packets, the delay jitter characteristics indicating at least a change in transmission delay of the service data packets;

determine whether jitter optimization is to be performed according to the delay jitter characteristics and delay jitter requirements of the service data packets; and transmit first indication information to a core network element when the jitter optimization is determined to be performed, the core network element being configured to start delay jitter optimization in response to the first indication information, wherein the jitter optimization is determined to be performed when the change in the transmission delay of the service data packets according to the delay jitter characteristics exceeds a change threshold required by the delay jitter requirements.

15. The data transmission apparatus according to claim 14, wherein the processing circuitry is configured to:

determine the delay jitter requirements based at least on one of a type of service of the service data packets or receiving end capability information, wherein the first indication information includes at least one optimization parameter, the core network being configured to update a jitter processing policy of the core network element according to the at least one optimization parameter.

16. The data transmission apparatus according to claim 14, wherein the processing circuitry is configured to:

transmit second indication information for establishing a protocol data unit (PDU) session to the core network element, the core network element being configured to establish the PDU session for transmitting the service data packets in response to the second indication information; and transmit third indication information to a user plane function (UPF) entity, the UPF entity being configured to count and report the delay jitter characteristics of the service data packets in the PDU session in response to the third indication information.

17. The data transmission apparatus according to claim 14, wherein the processing circuitry is configured to:

generate jitter requirement information according to service attribute information corresponding to the service data packets; and transmit the jitter requirement information to the core network element, the core network element being configured to set a jitter processing policy based on the jitter requirement information to transmit the service data packets based on the jitter processing policy.

18. The data transmission apparatus according to claim 17, wherein, to receive the delay jitter characteristics, the processing circuitry is configured to:

obtain the delay jitter characteristics reported by a user plane function (UPF) entity after the jitter requirement information is transmitted to the core network element.

19. The data transmission apparatus according to claim 14, wherein the delay jitter requirements of the service data packets are determined according to at least one of:

a tolerance of the service data packets to a delay jitter, a size of a playback buffer corresponding to the service data packets, a playable duration of the playback buffer corresponding to the service data packets, service characteristics corresponding to the service data packets, transmitting end capability information of the service data packets, receiving end capability information of the service data packets, or coding and decoding algorithms corresponding to the service data packets.

20. The data transmission apparatus according to claim 19, wherein when the delay jitter requirements of the service data packets are determined according to the size of the playback buffer corresponding to the service data packets, the size of the playback buffer is inversely correlated with a level of the delay jitter requirements; and when the delay jitter requirements of the service data packets are determined according to the playable duration of the playback buffer corresponding to the service data packets, the playable duration is inversely correlated with the level of the delay jitter requirements.

* * * * *